Sept. 30, 1924.   B. F. BURKIT   1,510,036
CORN PLANTER
Filed March 5, 1921    2 Sheets-Sheet 2
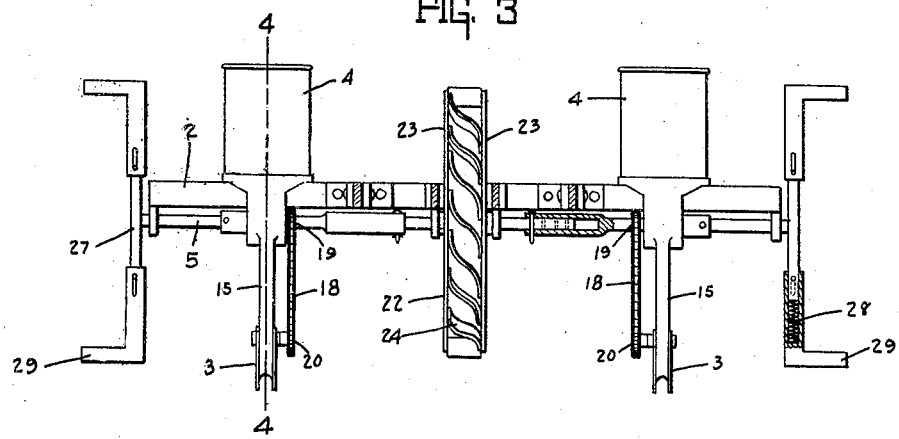
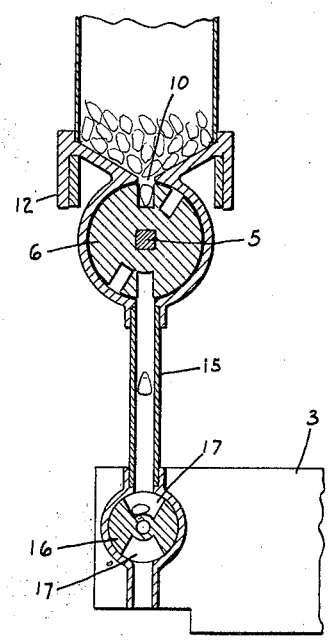
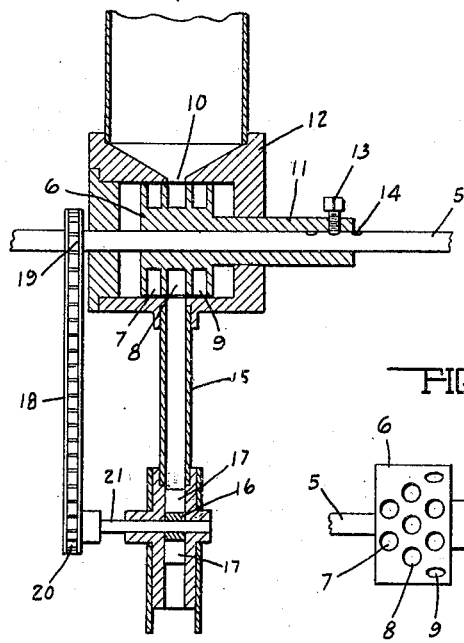
Inventor
BENJAMIN F. BURKIT.
By
Attorney Patented Sept. 30, 1924.

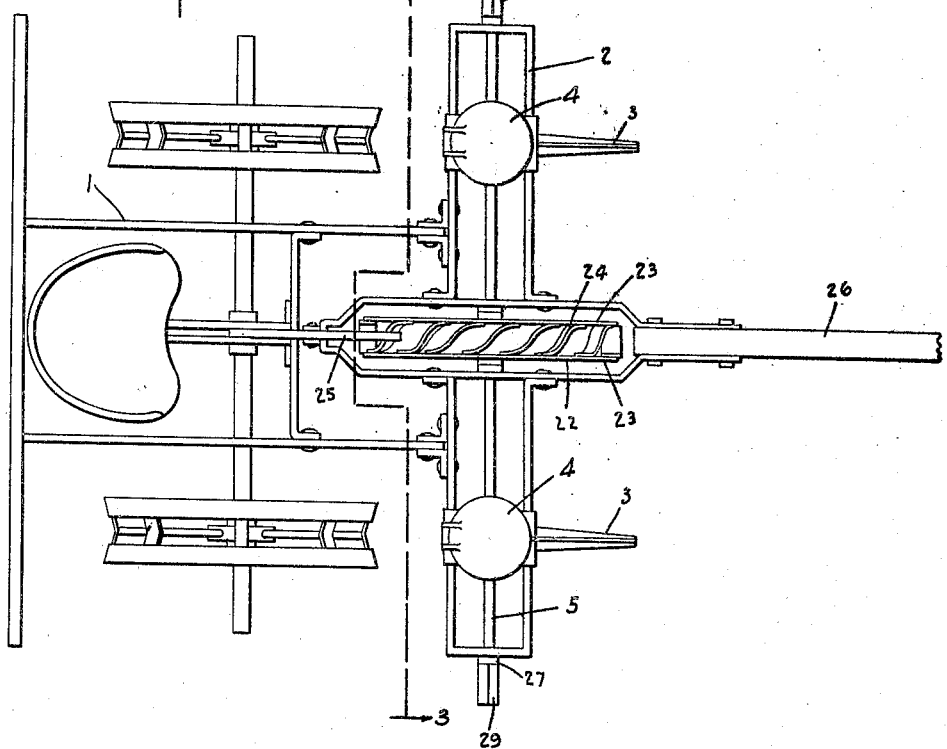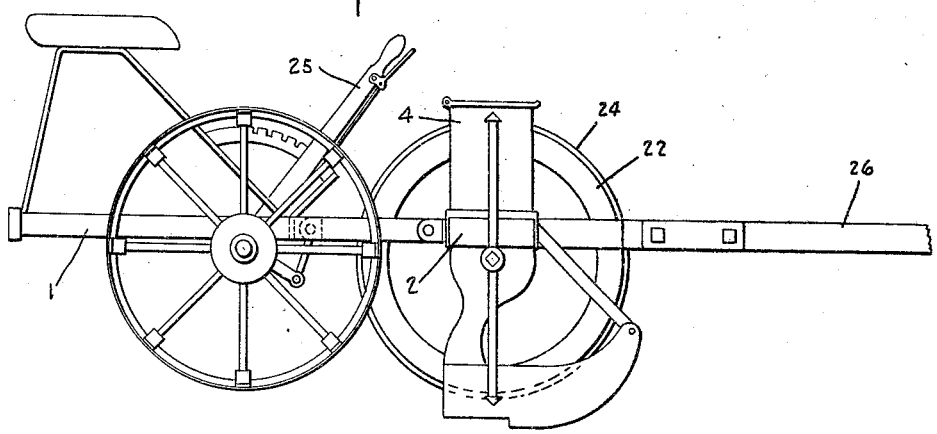

1,510,036

UNITED STATES PATENT OFFICE.

BENJAMIN F. BURKIT, OF WALTON, INDIANA.

CORN PLANTER.

Application filed March 5, 1921. Serial No. 450,002.

*To all whom it may concern:*

Be it known that I, BENJAMIN F. BURKIT, a citizen of the United States, residing at Walton, in the county of Cass and State of Indiana, have invented certain new and useful Improvements in Corn Planters, of which the following is a specification.

This invention relates to improvements in corn planters. The prime feature of the invention is the provision of means for driving the dropping mechanism direct, thereby dispensing with many parts heretofore required in planters of this class, and greatly simplifying the construction, as well as reducing the cost of production thereof.

A further feature of the invention is the provision of dropping plates so constructed that the same plate may be used for dropping a greater or less number of grains of the corn at each operation.

A further feature of the invention is the provision of means for depositing the grains of corn in the furrow so that they will be bunched, or all discharged into the furrow at one operation.

A further feature of the invention is the provision of markers so arranged that they will accurately indicate the position of each hill of corn after it has been dropped into the furrow.

Other objects and advantages will be hereinafter more fully set forth and pointed out in the accompanying specification.

In the accompanying drawings,

Figure 1 is a top plan view of a planter showing my improved construction attached thereto, Figure 2 is a side elevation thereof, Figure 3 is a sectional view as seen on line 3—3 Figure 1, Figure 4 is an enlarged detail sectional view as seen on line 4—4 Figure 3, Figure 5 is a sectional view at right angles to the section shown in Figure 4, and Figure 6 is a detail elevation of the dropping plates.

Referring to the drawings in which similar reference numerals designate corresponding parts throughout the several views, 1 indicates the main frame of the planter which may be constructed in the usual or any preferred manner, the forward end of which is pivotally secured to an auxiliary frame 2, and to this frame is adjustably attached the usual or any preferred form of furrow forming runners 3 and seed hoppers or boxes 4.

Extending longitudinally of the auxiliary frame 2 is a shaft 5 which is preferably square in cross section and if desired may be made in sections so that it can be adjusted longitudinally, said shaft having mounted thereon dropping wheels or cylinders 6 around the periphery of which are formed series of pockets 7, 8 and 9, said series of pockets being preferably arranged on diametrically opposite sides of the axis of the plates and varied in number so that a greater or less number of grains of corn may be discharged in each hill, there being preferably two of the pockets 7, three of the pockets 8 and four of the pockets 9 in each series. Consequently, when the pockets 7 are in registration with the discharge opening 10 in the bottom of the hopper 4 two grains of corn will be deposited in each hill, while if the series of pockets 8 are in registration with said opening three grains of corn will be deposited in each hill, and likewise four grains of corn will be deposited in each hill when the series of pockets are in registration with the opening 10.

The plates 6 are slidably mounted upon the shaft 5 and are driven by the shaft, each plate having an elongated hub 11 which projects through one wall of the housing 12 encasing the plate, any suitable means being provided for holding the plate in adjusted position on the shaft 5, such as a set screw 13 which co-operates with counter sunk seats 14 in the shaft 5. By this means any one of the series of pockets may be positioned for registration with the opening 10 and when the set screw is properly engaged with one of the seats the plates will be held in fixed position.

The corn or grain being sowed is carried through a hose or pipe 15 to the rear end of the furrow forming runners 3, and in order to deposit all of the grain simultaneously, so as not to scatter the grain, a dropping disk 16 is positioned at the lower end of the hose 15 and in close proximity to the lower edge of the runners 3, said disk 16 having pockets 17 therein into which the grain is deposited when discharged from the pockets of the plates 6, so that although the pockets in the plates 6 discharge a single grain, the entire number of grains to be placed in each hill will be deposited in one of the pockets 17 before the disk 16 is rotated, consequently all of the grains will be dropped into the furrow at once and in compact formation. Any suitable means may be provided for rotating the dropping disk 16, such as a sprocket chain 18 which passes around sprockets 19 and 20 on the shaft 5 and the shaft 21 respectively, the latter shaft carrying the dropping disk 16.

It is customary in operating planters of this class to provide an indirect drive for operating the dropping plates 6, but in the present instance a direct drive is provided, thereby simplifying the construction of the device and eliminating a number of parts by placing a driving wheel 22 on the shaft 5, and preferably at the longitudinal center of said shaft, said wheel being preferably formed of a pair of rings 23 between which are placed bars 24, said bars preferably resting in a substantially spiral or angular position to the axis of the shaft 5 and projecting beyond the outer edges of the rings 23, consequently said bars will more readily travel over the surface of the soil and will give a more perfect traction to the wheel. Likewise, the wheel will more readily travel over unpulverized soil as the bars 24 will tend to cut through clods and in case of damp soil, such as would adhere to the tread surface of the wheel, will pass between the bars and will not act to retard the operation of the wheel.

The auxiliary frame 2, together with the runners 3 and driving wheel 22 are raised and lowered through the medium of a lever 25 which is pivoted to parts of the main frame 1 and is connected to the rear portion of the auxiliary frame 2, the usual form of tongue 26 also being attached to parts of the auxiliary frame 2, so that the outer end thereof will form a fulcrum for the auxiliary frame when the lever 25 is operated to raise the auxiliary frame and parts carried thereby, and when said parts are raised the drilling portion of the planter will be entirely out of operation.

When the grain is to be planted in hills, or what is commonly known as checked, so that the rows will stand in a substantially straight line in either direction, markers 27 are attached to the opposite ends of the shaft 5, said markers being preferably formed in sections and held in extended position by means of springs 28 so that said markers may telescope as when uneven surfaces are encountered, the springs normally holding the outer members of the markers in extended position. The outer members of the markers are preferably provided with laterally extending arms 29 which strike the surface of the ground and leave an impression in the surface, and said arms are so positioned that the marks made thereby will be in direct alignment with the discharge of the seed from the pockets 17 of the disk 16, consequently when the end of the field is reached the operator can readily set the machine so that the hills of the next succeeding rows will be in transverse alignment with the hills of the preceding rows.

By operating the shaft 5 from the driving wheel 22 and mounting the dropping plates 6 on said shaft in the manner shown, the construction of the planter is very materially simplified and is more direct in its operation as the drive is positive and does not depend upon any other operation of the planter for its source of power. In applying the planter to use the wheels or cylinders 6 are set with respect to the opening 10 and as shown in Figure 5 three grains of the corn will be planted in each hill. After the planter has been driven into the field the lever 25 is operated and the auxiliary frame 2 and parts carried thereby lowered until the runners 3 and driving wheel 22 engage the surface of the ground; as the planter is driven forwardly the driving wheel 22 will operate the wheels 6 and discharge the grain into the hose extending from said plates to the dropping disk and these latter disks are operated so as to deposit the grains in a furrow at predetermined distances apart. When the end of the field is reached the lever 25 is again operated to lift the runners and driving wheel out of engagement with the soil when the planter is turned and positioned ready for planting additional rows of the grain. The markers and parts to which they are attached are then manually manipulated until they are in registration with the imprints of the marker in the preceding row when by again lowering the auxiliary frame and parts carried thereby the succeeding hills of corn will be deposited in the furrows in line with the preceding hills.

Having thus fully described my said invention, what I claim as new and desire to secure by Letters Patent, is:

In combination, a hopper, a housing adjacent the bottom of the hopper having an opening communicating with the hopper said housing having bearings in its end walls, a dispensing wheel having a hub slidably mounted in one of the bearings the wheel and its hub being provided with a bore, a drive shaft extending through the other bearing in the housing and through the bore of the hub said dispensing wheel being provided with a plurality of sets of pockets for selective registration with the housing opening, and means for rotating said drive shaft, substantially as set forth.

In witness whereof, I have hereunto set my hand and seal at Indianapolis, Indiana, this 2nd day of March, A. D. nineteen hundred and twenty-one.

BENJAMIN F. BURKIT. [L. S.]

Witnesses:
 CAREY S. FRYE,
 M. L. SHULER.